Oct. 8, 1968     E. K. FAIRBANKS ET AL     3,404,455

ELECTRICAL CONTACTS AND METHOD OF FABRICATION

Original Filed Aug. 2, 1965     3 Sheets-Sheet 1

FIG 7 (FIG 7 referenced)

United States Patent Office 3,404,455
Patented Oct. 8, 1968

3,404,455
ELECTRICAL CONTACTS AND METHOD
OF FABRICATION
Edward K. Fairbanks, Silver Spring, and Donald E. Reed, Kensington, Md., and John L. Toth, Falls Church, Va., assignors to Space Components, Inc., Washington, D.C., a corporation of the District of Columbia
Continuation-in-part of application Ser. No. 202,860, June 15, 1962. Division of application Ser. No. 476,336, Aug. 2, 1965, now Patent No. 3,310,650, dated Mar. 21, 1967. This application Sept. 15, 1966, Ser. No. 590,170
4 Claims (Cl. 29—630)

ABSTRACT OF THE DISCLOSURE

This specification discloses a method and apparatus for forming cup shaped electrical contacts from wire mesh. The wire mesh is initially formed into a generally cup shaped formation and then introduced into a die which compacts the entire mass to a required density. An impact shaft is then passed through a central passage in the innermost die member to compact the central portion of the cup bottom to substantially fuse this portion to a density greater than the remaining portion.

---

This application is a continuation-in-part of application Ser. No. 202,860 filed June 15, 1962, presently pending before the U.S. Patent Office. This application is also a division of application Ser. No. 476,336, which matured into U.S. Patent No. 3,310,650. This invention relates to electromagnetic switching devices and more particularly to the electrical contact structure therein and the method of fabrication of special electrical contacts.

The invention is characterized by a novel electrical contact element for cooperation with other components of an electrical circuit such as the relay structure disclosed in the above-identified pending application. The contact element is formed of thin metal mesh which functions as an energy absorber, i.e., it absorbs most of the kinetic energy of the moving element which makes or breaks the electrical circuit. This energy absorption is a critical feature of precision relays inasmuch as the kinetic energy of the armature upon the actuation thereof must be absorbed in order to materially reduce chattering or vibration of the armature immediately after contact. The novel electrical contact according to this invention enjoys the further advantage that the point thereof which is contacted by the armature to effect electrical connection may for certain applications be made of a material different from the thin wire mesh thereby combining the desirable characteristics of certain conductors with the desirable electro-mechanical qualities of the mesh.

Figure 9:
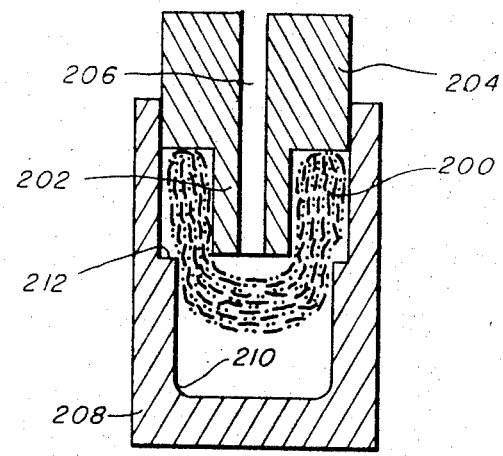
Figure 10:
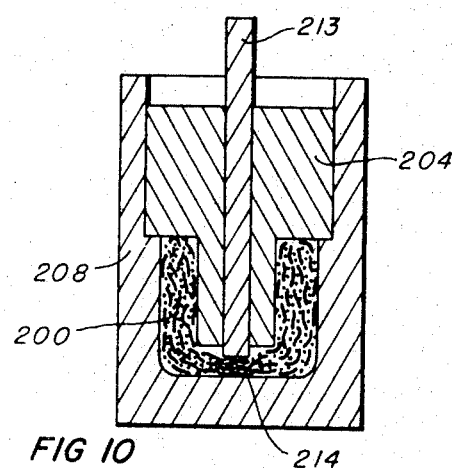
Figure 11:
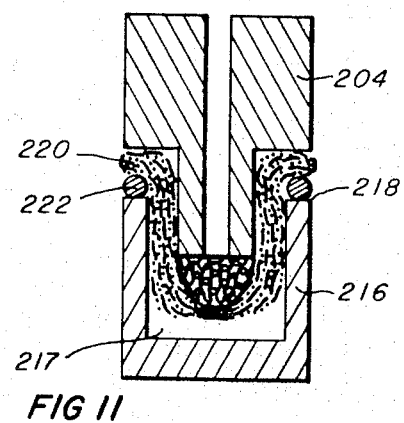

FIGURES 9, 10, and 11 are cross-sectional views of die elements used to fabricate alternative mesh contact elements.

Figure 12:
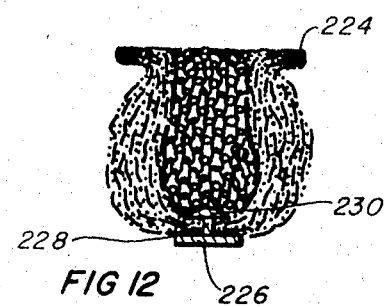

FIGURE 12 is a cross-sectional view showing a modified form of contact button element.

Figure 13:
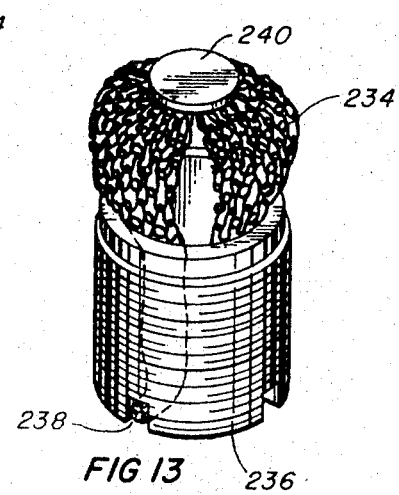

FIGURE 13 is a perspective showing of a further modification of a contact element.

Figure 14:
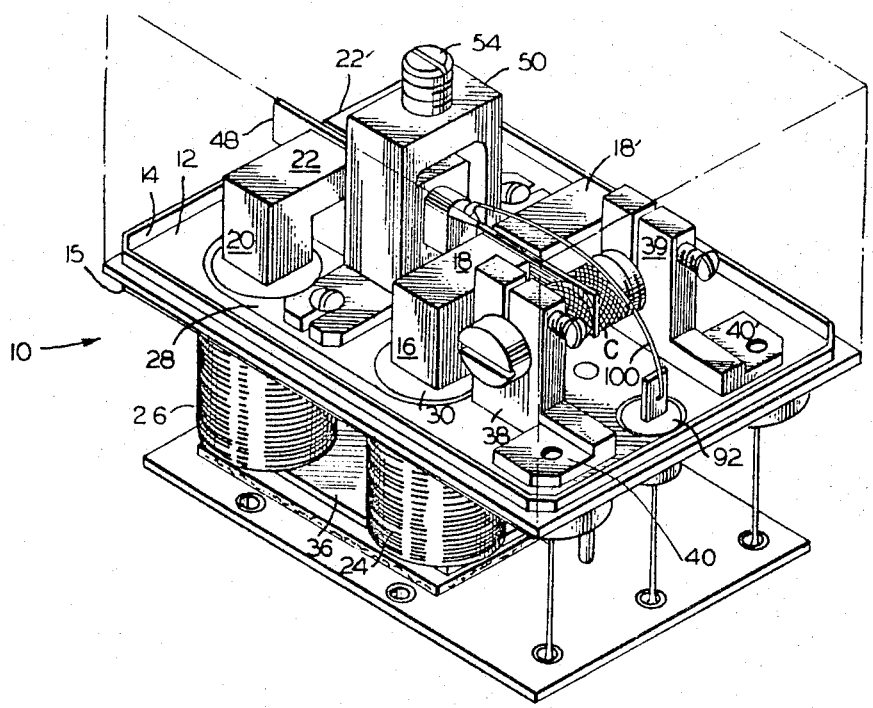

FIGURE 14 is a perspective view of a precision relay showing mesh contact elements mounted for absorption of the kinetic energy of the rotating armature.

Figure 1:
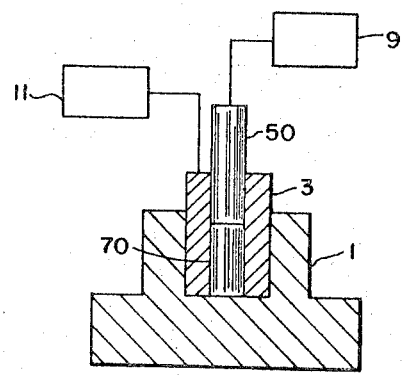
FIGURE 1 is a sectional diagrammatic view of the die apparatus utilized to form applicants' contact elements.
Figure 2:
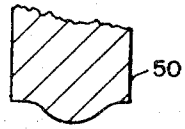
FIGURE 2 is an enlarged sectional view of the contoured end portions of the two forming dies and the contact element formed thereby.
Figure 3:
FIGURE 3 is an alternative embodiment of the end structure for the forming dies.
Figure 4:
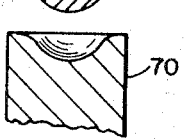
FIGURE 4 is an additional alternative end structure for the forming dies.

In the drawings, elements 1, 3, 50, 70, 60, 51, 61, 71, 52, 62, 72, 11, 31, 53, 131, 73, 135, 63, 64, 208, 213, 204, 216, 222, and 226 are bodies of revolution and are shown in figures of the drawing cut through the axis of revolution and are therefore symmetrical in every instance. Referring to FIGURE 1 in the drawing, the numeral 1 indicates the die support means having a cylindrical bore therein with a die holding means 3 snugly fitted with said bore. Die holding means 3 has a central cylindrical bore extending therethrough and snugly fitted within said central bore are lower die member 70 and upper die member 50. It will be understood that element 3 and element 50 may be connected to any conventional power source, electrical, hydraulic or mechanical which will move them up or down under the control of an operator or automatic mechanism. These conventional power sources are indicated as elements 9 and 11. FIGURE 2 illustrates the contoured end structure to be utilized at the end of element 50 which cooperates with the end of element 70 to form an electrical contact element 60 therebetween. The steps of fabricating an electrical contact 60 will now be described. Die support means 1 has inserted therein die holding means 3 and lower die 70 with the contoured surface thereof uppermost. A section of resiliently interlocked wire mesh fabric is inserted into the cavity of die holding means 3 before upper die 50 is inserted. The resilient interlocked metallic mesh may be formed of woven or knitted metallic conducting material. Exemplary compositions would be gold, silver, brass, copper alloys, silver alloys, and nickel alloy. The primary characteristics of the wire from which the mesh is formed are the ability to cold flow under pressure and good electrical conductivity. Experience has proven that the preferred embodiment of this material is knitted of wire of .003 to .020 inch diameter in tubular form in the nature of an endless stock. The inherent benefit of this raw stock material is that in severing a portion of the mesh only two ends of wire are formed on the tubular section to be used to make a contact. Further, it has been found advisable to double this tubular mesh upon itself in order to insure that even these two wire ends will be deep within the contact element after final fabrication. The mass of resilient metallic fabric is inserted within the cavity directly above the contoured surface of the lower die 70 and upper die 50 is then inserted above the resilient mesh and pressure applied by power source 9 to form the resilient mesh into a compacted mass. It should be noted that the preferred embodiment of applicants' apparatus forms a contact element with at least two zones of compactness and in every instance a mounting rim is formed which can be later joined to a mounting element or ring which can be cold fused to the contact element to facilitate the mounting of the contact element to its supporting means. Referring further to FIGURES 3 and 4, the steps of forming contact elements 61 and 62 and the coaction of die elements 51 and 71; 52 and 72 are analogous to the above-described forming of contact element 60 and die elements 50 and 70. It will be noted that the contact element itself has a different configuration in each instance due to the different configuration of the contoured die elements.

Figure 5:
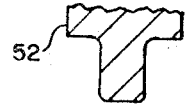
FIGURE 5 is a sectional diagrammatic view of an alternative embodiment of applicants' die forming structure.
Figure 6:
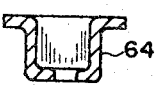
FIGURE 6 is a sectional view of a contact element formed by the die structure shown in FIGURE 5.
Figure 7:
FIGURE 7 is an alternative internal pin structure for the upper forming die.
Figure 7:
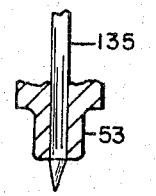
Figure 8:
FIGURE 8 is a sectional view of an additional embodiment of contact element produced by the die structure of FIGURE 5.

Referring now to FIGURE 5. Element 11 is analogous to element 1, element 31 is analogous to element 3, elements 53 and 73 are analogous to elements 59 and 70; however, elements 53 and 73 are provided with a small diameter central bore extending therethrough and blunt ended pin element 131 is positioned within said central bore in element 53. Elements 132, 133 and 134 are conventional power sources analogous to elements 9 and 11, and with respect to elements 131, 53 and 31 are operative to raise and lower these cylindrical elements to apply the desired force for engaging the die elements. Referring to FIGURE 7, FIGURE 7 illustrates the modification of FIGURE 5 by the replacement of blunt ended element 131 by a sharp ended element 135 which will enable the formation of a centrally positioned hole through the contact element if so desired. Referring now to FIGURE 6, FIGURE 6 shows a contact element 64 formed by the die elements 53, 73, and 135 it being understood that element 135 is lowered and driven through the mesh prior to the seating of element 53 in its lowermost position in the formation of contact element 64. Refer now to FIGURE 8, contact element 63 is formed by die elements 53, 73, and 131. It will be understood that die element 131 in the first instance is lowered together with die element 53 until the final cup shaped portion of contact element of 63 is formed, and then die element 131 is lowered slightly to force the central portion of cup shaped element 63 into a small hemispheric centrally positioned protuberance. Referring now to FIGURE 9, the numeral 200 denotes a plurality of layers of thin wire mesh wrapped completely around a hollow extension portion 202 of an upper die 204. The die and the extension portion are provided with a central aperture 206. A lower die 208 with a rounded bottom cavity 210 and circumferential shoulder 212 cooperates with the upper die to compress and compact the mesh 200 upon downward movement of the upper die. As illustrated in FIGURE 10, shoulder 212 limits the extent of downward motion of the upper die to preclude excessive compacting of the mesh. When the upper die 204 has reached its downward limit of travel an elongated tool 213 is placed in aperture 206 and moved downwardly until its lower tip engages the mesh 200. The mesh between the lower tip and the bottom cavity 210 is further compressed and compacted by the tool 213 and fuses to thereby form a portion 214 of greater density than the remainder of the mesh. The portion 214 thus comprises the same metal as that of mesh 200 but is completely compacted and fused to form a homogeneous mass. If desired, the operation employing tool 213 may be omitted, the mesh without contact tip 214 serving, for example, in applications where currents are low.

FIGURE 11 illustrates a method of modifying the final product of the steps of FIGURES 9 and 10 to facilitate its mounting to a contact support such as screw. According to this method, the mesh article is placed into a lower female die member 216, the same upper die 204, for convenience, being employed. Die 216 is provided with a cavity 217 which defines an upper peripheral rim 218. The mesh element is placed in the cavity 217 with its upper peripheral portion flaring outwardly, as indicated by the numeral 220. A copper or other soft ring 222 is placed on rim 218 prior to the positioning of the mesh element and is thus sandwiched by the rim and the flaring portion 220. Upper die 204 is now moved downwardly and copper ring 222 is compressed and fuses with the peripheral flaring portion 220. The resulting fusion is denoted by numeral 224 in FIGURE 12. The contact element may now be easily affixed, as by soldering portion 224 to a contact member.

FIGURE 12 also illustrates an alternative method of providing the mesh contact member with a contact point. The contact point here comprises a button 226 having an integral pintle 228 extending through mesh 200 and retained by an enlargement 230 of the pintle as by peening. Button 226 may be of any desired conducting material, as for example palladium. In the construction here illustrated, the desirable point contact properties of a specified conductor, such as palladium, may be combined with the desirable mechanical features of the wire mesh 200. In other applications, the fused portion 214, formed of the material from which the mesh 200 is formed, may be suitable.

FIGURE 13 illustrates a modified construction of a contact member and includes a wire mesh strand 234 of generally thin rectangular cross-section forming an element of generally U-shape. The ends of the U are placed interiorly of base 236 having a hollowed portion 238 or any other suitable recesses to receive the ends. The ends may be secured as by soldering. Midway of the bight portion of strand 234 a contact button 240 is situated, similar to contact button 226 of FIGURE 12. If desired, the button 240 may be entirely omitted. Alternatively, a fused tip, such as 214 of FIGURES 10 and 11, may be used in lieu of the button contact.

Referring now to FIGURE 14. FIGURE 14 indicates an operative embodiment utilizing contacts as disclosed and fabricated by applicants' novel methods. The relay shown in FIGURE 14 is the subject of the above-identified copending application of which this application is a continuation-in-part and will be described herein only insofar as to make clear the inherent value of contacts such as are disclosed in this application. Numeral 10 indicates the relay combination, and includes a mounting plate 12 preferably formed of a non-metallic material, brass having been found suitable. The upper and lower peripheries of the mounting plate 12 are provided with integral, upstanding circumferential lips 14 and 15 respectively to facilitate the placement of upper and lower covers on the relay. The numerals 16 and 20 denote field pieces of magnetic material, preferably ferrite, of generally L-shape having leg portions 18 and 22 respectively. There are four such field pieces, two of which are denoted by primes. The field pieces 16 and 20 are surrounded by windings 24 and 26 respectively. Numeral 28 denotes a metallic insert fitted in a complementary recess in mounting plate 12 and extending completely therethrough. Numeral 30 denotes a glass portion hermetically fitted into and bounded by said insert and through which hermetically passes the field piece. Plate 12, insert 28 and glass portion 30 form a hermetic seal between the upper and lower portion of the plate. It has been found that ferrite exhibits both the required electrical properties for the field pieces of this relay and susceptability to encasing by the glass portion 30, thereby allowing for hermetic sealing. Ferrite has a high ohmic resistance and high permeability, the former minimizing eddy current losses. Conventional homogeneous materials of high permeability give rise to undesirable eddy current losses while such non-homogeneous materials, i.e., laminated, were found unsuitable because of the small but finite space between the laminations which precluded complete hermetic sealing. Numeral 36 denotes a plate of magnetic material, also preferably ferrite, which abuts the lower ends of the field pieces, the ends being lapped to provide full and uniform contact. Plate 36 forms a common magnetic path for the field pieces.

The numerals 38 and 39 denote a pair of contact mounting brackets, each provided with ear portions 40 and 40' respectively positioned slightly above mounting plate 12. Reference character C denotes a threaded element which passes through mounting bracket 39, supporting applicants' contact element, described in detail hereinabove, formed of thin wire mesh, and includes a portion of the tip thereof adapted to make electrical contact with the pivoted polarized armature 48. It will be understood that plate 36 is mounted upon a plate of insulating material such as fibreglass board. A hermetically sealed conductor passes through plate 12 and the numeral 92 identifies the glass portion of this insulator. A somewhat flexible conductor 100 connects the conductor passing through glass portion 92 to armature 48 pivoted by elements 50 and 54. The detailed operation of this relay will not be further explained in this application inasmuch as it is sufficient to indicate that a precision relay is provided with a pivoted armature which pivots between two mesh contact buttons to make or break circuits external to said relay. These mesh contact buttons indicated by referenced character C and their associated method of manufacture are the heart of applicants' invention.

The central characteristic of applicants' novel contact element is the provision of a portion intermediate the contact making surface such as 214 and the contact element supporting surface such as 39 of a resiliently interlocked compacted thin metallic wire mesh. This mesh absorbs the kinetic energy of the contact making element which strikes the contact surface thus inhibiting chatter or vibration of the contact making element after initial mechanical contact with the contact element. It is believed that the major portion of the kinetic energy of the moving element is transformed into heat by friction between the multitudinous thin metallic resiliently interlocked filaments which compose the contact element. Further, the characteristics of the electrical contact are enhanced by further compacting the metallic mesh filament portion at the surface which makes the contact. This provides a contact element composed entirely of metallic mesh but with at least two degrees of compactness or density. It has been found that the best contact characteristics are provided by having the denser contact element portion as the contact making portion of the contact element. It will be understood that each of contact elements 60, 61, 62, 63, and 64 may be provided with a ring such as 222 to facilitate the mounting thereof; that elements 60, 62, 63 and 64 may have a button such as 226 attached to obtain the additional benefits as described with respect to FIGURE 12, and that any combination of dies 50, 70, 51, 71, 52, 72, 53, 73, 131 and 135 may be utilized as will be apparent to one skilled in the art to produce contacts of special configuration.

We claim:

1. A method of forming a wire mesh contact element which includes the steps; of wrapping a plurality of layers of wire mesh around a hollow first die, placing said die and said mesh in a second die, moving said die portions together to thereby compact said mesh to a first density, inserting a tool in said hollow first die until it contacts a portion of said mesh and then moving said tool towards said second die to further compact said mesh immediately adjacent said tool, whereby a portion of greater density is formed.

2. A method of making an electrical contact comprising: providing a supply of resiliently interlocked wire mesh, die-forming said mesh to a first density, die-forming a localized portion of said mesh to a substantially greater density, providing a solid metallic mounting washer, and cold-welding said washer to said mesh.

3. In the production of electrical contacts from resiliently interlocked wire mesh, the method including the steps of: forming a cup shaped mass of said wire mesh; compacting the entire mass to a homogenous density providing a high degree of electric conductivity across engaging wires of said mesh, and then substantially fusing a localized bottom portion of said mass by further compacting to provide a fused central portion of greater homogeneity and density than the remaining portion.

4. In the production of an electrical contact from a cup shaped mass of resiliently interlocked wire mesh, the method including the steps of: confining the entire mass and compressing the mass while so confined to compact the mass to a homogenous density providing electric conductivity across engaging wires of the mesh; and then fusing a localized bottom portion of the mass by further compacting while confined to provide a fused central bottom portion of greater homogeneity and density than the remaining portion.

References Cited

UNITED STATES PATENTS

| 2,487,167 | 11/1949 | Siefried et al. | 200—166 |
| 2,680,284 | 6/1954 | Markowski et al. | 29—419 |
| 3,165,826 | 1/1965 | Bentov | 29—419 |

JOHN F. CAMPBELL, Primary Examiner.

C. E. HALL, Assistant Examiner.